(12) United States Patent
Kirk

(10) Patent No.: US 6,761,825 B2
(45) Date of Patent: Jul. 13, 2004

(54) METHOD FOR REMOVING ODORS IN STERILIZED WATER

(75) Inventor: Allen G. Kirk, Wilmington, DE (US)

(73) Assignee: I. du Pont de Nemours and Company, Wilmington, DE (US)

( * ) Notice: Subject to any disclaimer, the term of this patent is extended or adjusted under 35 U.S.C. 154(b) by 368 days.

(21) Appl. No.: 09/921,816

(22) Filed: Aug. 3, 2001

(65) Prior Publication Data

US 2002/0020672 A1 Feb. 21, 2002

Related U.S. Application Data

(60) Provisional application No. 60/223,041, filed on Aug. 4, 2000.

(51) Int. Cl.$^7$ .................................................. B01D 15/00
(52) U.S. Cl. ........................ 210/660; 210/758; 210/760; 210/753; 210/754; 210/916; 215/352; 215/261
(58) Field of Search ................................ 210/660, 758, 210/760, 753, 754, 916; 215/352, 261

(56) References Cited

U.S. PATENT DOCUMENTS

| | | |
|---|---|---|
| 3,264,272 A | 8/1966 | Rees |
| 3,355,319 A | 11/1967 | Rees |
| 3,404,134 A | 10/1968 | Rees |
| 4,234,456 A * | 11/1980 | Kamiya et al. ............. 502/405 |
| 4,321,337 A | 3/1982 | Smith |
| 5,436,282 A | 7/1995 | Gustafsson et al. |
| 5,603,997 A | 2/1997 | Lindgren et al. |
| 5,731,053 A | 3/1998 | Kuhn et al. |
| 5,750,611 A | 5/1998 | Trouilhet |
| 5,834,079 A | 11/1998 | Blinka et al. |
| 5,950,435 A * | 9/1999 | Kaizuka ........................... 62/1 |
| 6,179,141 B1 * | 1/2001 | Nakamura .................. 215/352 |
| 6,465,066 B1 | 10/2002 | Rule et al. |

FOREIGN PATENT DOCUMENTS

| | | |
|---|---|---|
| WO | WO 96/40429 | 12/1996 |
| WO | WO 98/25974 | 6/1998 |

* cited by examiner

Primary Examiner—Chester T. Barry

(57) ABSTRACT

The invention herein provides a method of treating water in situ to both sterilize the water and remove unwanted odors and tastes produced during sterilization. The water is preferably intended for drinking. The water is sterilized by a sterilizing treatment such as ozonation and the odors are removed by incorporating zeolite into the container cap, a capliner, or both. The invention also provides a container for packaging sterilized water for human consumption.

8 Claims, No Drawings

METHOD FOR REMOVING ODORS IN STERILIZED WATER

CROSS-REFERENCE TO RELATED APPLICATIONS

Applicant claims the benefit of priority to provisional application 60/223,041 filed Aug. 4, 2000.

BACKGROUND OF THE INVENTION

1. Field of the Invention

The present invention relates to a process for treating water in situ. The invention specifically relates to a process for treating water in situ to both sterilize and remove odor and taste-producing substances in the water.

2. Description of Related Art

From a general point of view, it is known to remove undesired odors or tastes by means of adsorbing substances, e.g., activated carbon, silica gel, activated aluminum oxide, diatomaceous earth and zeolites. Zeolites are known to be useful for eliminating unwanted odors and/or tastes in plastics. For example, U.S. Pat. No. 5,436,282 discloses a process for eliminating in plastic materials (such as plastic pipes, plastic film and sheeting, plastic containers and plastic interior fittings) low contents of odor/taste-producing substance which have been formed by physical and/or chemical action in the polymerization process of the subsequent compounding/processing. During processing in the molten state, less than 0.5 wt % of a substantially hydrophobic aluminum silicate molecular sieve having a pore diameter of at least 5.5 angstroms, a Si/Al molar ratio in the crystal lattice of at least 35 is added to the plastic material.

Compounds normally associated with causing bad odor or bad taste problems are oxidized hydrocarbons. These can include aldehydes, ketones and acids. While the use of zeolites are known to help reduce such unwanted odors or tastes, typically attributed to the presence of degradation products formed during the thermoprocessing of polymers, some environments pose a more difficult problem.

Ozonation, used to sterilize water for drinking, poses a difficult odor and taste problem. Ozone is a particularly strong reactant. As well, it provides its own oxygen atom for degradation reactions. In other sterilizing methods, e.g., UV, heat gamma ray, etc., the energy is available to fuel degradation reactions but the oxygen must be supplied by the local environment. Thus, these sterilizing methods would not be expected to cause as much oxidation as quickly as that caused by ozonation. Hence, ozonation of water poses an especially difficult odor and taste problem.

BRIEF SUMMARY OF THE INVENTION

The invention provides a method of treating water in situ to both sterilize the water and remove unwanted odors or tastes produced during sterilization, comprising the steps of:
  (a) filling a plastic container with water;
  (b) sterilizing the water by employing a sterilizing treatment or by adding a sterilizing agent to the plastic container;
  (c) sealing the plastic container with a cap having an interior surface, wherein the cap comprises an odor-scalping material;
such that any unwanted odors or tastes produced by the sterilization treatment or by the addition of the sterilizing agent are absorbed by the odor-scalping material.

The odor-scalping material is preferably a zeolite and the sterilizing treatment is preferably ozonation. The cap preferably comprises a cap liner affixed to the interior surface. The zeolite may be present in the cap liner alone at a level of about 0.05% to about 10% by weight of the capliner.

The invention also provides a container for packaging a sterilized water product for human consumption comprising:
  (a) plastic container free of odor-scalping material; and
  (b) a resealable cap for sealing the plastic container comprising an odor-scalping material.

The odor-scalping material is preferably zeolite and the container preferably contains sterilized water.

DETAILED DESCRIPTION OF THE INVENTION

Definitions

"Zeolite" herein refers to molecular sieves, including alumino phosphates and alumino silicates with a framework structure enclosing cavities occupied by large ions and/or water molecules, both of which have considerable freedom of movement permitting ion exchange and reversible dehydration. The framework may also contain other cations such as Mn, Ti, Co and Fe. An example of such materials are the titanosilicate and titanoaluminosilicate molecular sieves. Unlike amorphous materials, these crystalline structures contain voids of discrete size. A typical naturally occurring zeolite is the mineral faujasite having the following formula:

$$Na_{13}Ca_{11}Mg_9K_2Al_{55}Si_{137}O_{384}.235H_2O$$

Ammonium and alkylammonium cations may be incorporated in synthetic zeolites, e.g. $NH_4$, $CH_3NH_3$, $(CH_3)_2NH_2$, $(CH_3)_3NH$, and $(CH_3)_4N$. Some zeolites have frameworks of linked truncated octahedral (Beta-cages) characteristic of the structure of sodalite. Numerous synthetic zeolites are available.

"Copolymer" means a polymer polymerized from two or more monomers, and includes terpolymers.

"Ethylene alpha-olefin copolymers" means such heterogeneous materials as linear low density polyethylene (LLDPE), linear medium density polyethylene (LMDPE), and very low and ultra low density polyethylene (VLDPE and ULDPE); and homogeneous polymers such as metallocene catalyzed polymers (mPE) such as Exact® supplied by Exxon and Tafmer® polymers supplied by Mitsui Petrochemical Corporation. These materials generally include copolymers of ethylene with one or more comonomers selected from $C_4$ to $C_{10}$ alpha-olefins such as butene-1 (i.e., 1-butene) hexene-1, octene-1, etc. in which the molecules of the copolymers comprise long chains with relatively few side chain branches or crosslinked structures. This molecular structure is to be contrasted with conventional low or medium density polyethylenes, which are more highly branched than their respective counterparts. Other ethylene/alpha-olefin copolymers, such as the long chain branched homogenous ethylene/alpha-olefin copolymers available from the Dow Chemical Company, known as Affinity® resins, are also included as another type of ethylene alpha-olefin copolymer useful in the invention herein.

"Ethylene acid copolymers" means copolymers of ethylene with an olefinically unsaturated organic mono- or di-acid such as acrylic or methacrylic acid, or maleic acid or fumaric acid or their anhydrides, the acid (or anhydride) comprising about 0.5 to 50 mole percent of the total polymeric material. The ethylene/acid copolymers and their methods of preparation are well known in the art and are disclosed in, for example, U.S. Pat. Nos. 3,264,272; 3,404, 134; 3,355,319 and 4,321,337. The copolymers are termed "ionomers" when the acid is neutralized in whole or in part to produce a salt. The cations for said salts are usually an alkali metal such as sodium, potassium, zinc or the like. Ethylene/acid/acrylate terpolymer and corresponding ionomers are well known in the art to be copolymers of ethylene, an olefinically unsaturated organic acid such as acrylic or methacrylic acid and an alkyl acrylate or methacrylate termonomer (e.g. n-butyl acrylate or methacrylate or isobutylacrylate). Suitable acid copolymer and ionomers are available from the DuPont Company, Wilmington, Del., under the trade names Nucrel® and Surlyn®, respectively.

"EVA" means ethylene vinyl acetate copolymer.

"HDPE" refers to high density polyethylene.

"LDPE" refers to low density polyethylene.

"Polyester" herein refers to poly(ethylene terephthalate) ("PET"), PET modified by incorporating diacids other than terephthalic acid (such as isophthalic acid) or glycols other than ethylene glycol (such as cyclohexane dimethanol ("CHDM")), as well as copolymers containing terephthalic acid, CHDM and other dibasic acids such as isophthalic acid. The polyesters are generally obtained by known polymerization techniques from aromatic dicarboxylic acids, preferably the lower alkyl esters thereof such as the dimethyl ester of terephthalic acid. The aromatic dicarboxylic acid or its ester or anhydride is esterified or transesterified and polycondensed with a saturated diol such as ethylene glycol. Typical saturated diols include saturated aliphatic, cyclo-aliphatic, or aromatic diols, preferably the lower alkane-diols such as ethylene glycol. Mixtures of aliphatic carboxylic acid and saturated diols may also be used, but the above-described physical properties (i.e. melting point and glass transition temperature) must generally be satisfied.

"PP" refers to polypropylene.

Description

This invention provides a method of treating water in situ to both sterilize the water and remove unwanted odors and/or tastes produced during sterilization. The method begins with filling a plastic container with water. The water should preferably be suitable for drinking. The plastic container can be made from any suitable polymer including polyesters, polyethylene (HDPE, LDPE), ethylene alpha-olefin copolymers (e.g., LLDPE, LMDPE, mPE, etc.), ethylene acid copolymers, polypropylene, polybutylene, among others. Typically the containers are made by blow molding or injection molding.

Next the water is sterilized by employing a sterilizing treatment or by adding a sterilizing agent to the plastic container. Suitable sterilizing treatments include treating with UV light irradiation, electron beam irradiation or gamma irradiation, or preferably, ozonation. Ozonation typically involves bubbling gaseous ozone through the water in the plastic container. The temperature for ozonation is typically in the range of about 20° C. to about 50° C.

Ozonation is a strong sterilization method that causes a large amount of oxidation very quickly, compared to other sterilizing treatments. As such, the strong oxidation causes more degradation reactions relative to other sterilizing treatments, and therefore poses a greater problem of unwanted odors and tastes. This is especially evident in bottled water products since water has little or no flavor of its own.

Sterilization can also be accomplished by the addition of a sterilizing agent. Suitable sterilizing agents include, e.g., chlorine gas.

The sterilizing treatment or addition of a sterilizing agent is preferably accomplished before the plastic container filled with water is sealed. The plastic container is preferably sealed with a cap, and the cap is preferably threaded and resealable. The cap may additionally comprise a pressure retaining device such as a molded capliner, a gasket or gasketing material in disc form. The pressure retaining device would preferably be affixed to the interior surface, i.e., surface facing the water contained in the plastic container, of the cap. The pressure retaining device may be affixed, e.g., using adhesive or by a physical restraint such as a "snap-in" mechanism.

Per the invention herein, the cap comprises an odor-scalping material, preferably a zeolite. The odor-scalping material preferably comprises about 0.05% to about 10% by weight of the pressure retaining device, e.g., capliner, more preferably about 3% by weight, and may be present in the cap itself, or in both the pressure retaining device and the cap.

The preferred zeolite has a pore size of the cage structure in the range of about 1 to about 50 angstroms, preferably about 2 to about 10 angstroms, more preferably about 5 to about 8 angstroms. Zeolites are widely available; vendors include UOP, Mt. Laurel, N.J., who sell under the trade name Abscents®.

The cap preferably comprises a thermoplastic polymer and is formed by injection molding or compression molding. The thermoplastic polymer can be polyethylene, polypropylene, polyester, or other suitable thermoplastics known in the art. The cap liner also preferably comprises a thermoplastic polymer, preferably selected from the group consisting of: PP, HDPE, mPE, EVA, ethylene acid copolymers such as ethylene acrylic acid (EAA) and ethylene methacrylic acid (EMAA) copolymers, and ionomeric resins prepared from EAA and EMAA, polyesters such as PET, PETG, poly(butylene terephthalate) (PBT), poly (trimethylene terephthalate) (3GT), polyvinylchloride (PVC), styrene-butadiene rubber (SBR) and styrene-butadiene-styrene (SBS). This describes a control sample without Abscents®-3000 zeolite.

It should be noted that the cap and/or the pressure retaining device often contain organic lubricating additives and slip additives, among others. These additives may include materials such as erucamide, behenamide, stearamide, oleamide, ethylene bis-stearamide and ethylene bis-oleamide. Under stringent oxidizing conditions such as those from ozonation, many of these compounds will be oxidized forming degradation products carrying unwanted odor and tastes. These additives may typically be present in amounts ranging from about 0.01% to about 3% by weight of the cap and/or capliner.

The inventors have surprisingly found that by incorporating an odor-scalping material, preferably zeolite, in the cap alone, even in a capliner alone, odors and tastes generated by ozonation are easily removed. This is a surprising result given the difficulty of the odor/taste problem generated by ozonation of water.

Sealing the plastic container with the cap after sterilizing the water is preferably accomplished within about 0.001 to about 5 minutes after the completion of the sterilization, more preferably about 0.005 to about 2 minutes, and most preferably within about 0.01 to about 1 minute. This would meet the demands of a high-speed manufacturing line for producing bottled water products.

The invention herein also provides a container for packaging a sterilized water product for human consumption. The container comprises a plastic container free of odor-scalping material and a cap, preferably threaded and resealable, for sealing the plastic container wherein the cap comprises and odor-scalping material. The odor-scalping material is preferably a zeolite and the container preferably contains sterilized water. The foregoing description of the details of the method of the invention herein applies equally as well to the container of the claimed invention.

The following examples are presented to more fully demonstrate and further illustrate various individual aspects and features of the present invention. As such, the showings are intended to further illustrate the differences and advantages of the present invention but are not meant to be unduly limiting.

COMPARATIVE EXAMPLE A

This describes a control sample without Abscents®-3000.

Thermoplastic resins such as EVA (ethylene vinylacetate; e.g., containing 9% vinylacetate by weight and having a melt index of 7) are melt blended with typical slip additives (e.g., 0.5% by weight) such as erucamide, behenamide, etc. and prepared as packaging materials such as blow molded containers, sheeting, and film. It is known that when a container made from such a plastic material is filled with water, then treated with the strong sterilizing agent ozone, and then the container capped to seal in the sterilant so that it may continue to disinfect the water contents, that bad odor/bad taste contaminants are formed. This occurs due to the reaction between the strong oxidizer ozone and the plastic containers, cap, capliner, or the additives in any of these packaging materials. Additives may even be present on the surfaces of these packaging materials providing for easier interaction, thus higher concentrations of the bad odor/taste contaminants. Water thus packaged is not suitable for drinking.

EXAMPLE 1

Example 1. 3 weight % of the Abscents® 3000 zeolite (supplied by UOP company) is blended into the EVA copolymer resin described in Comparative Example B. Head space analysis reveals that none of the bad odor/taste components are present to contaminate the water but rather the have been completely removed by the zeolite even in the presence of the strong oxidizer ozone. Thus, the water package is suitable for drinking.

Having thus described and exemplified the invention with a certain degree of particularity, it should be appreciated that the following claims are not to be so limited but are to be afforded a scope commensurate with the wording of each element of the claim and equivalents thereof.

I claim:

1. A method of treating water in situ to both sterilize the water and remove unwanted odors or tastes produced during sterilization with ozone, comprising the steps of:
    (a) filling a plastic container with water;
    (b) sterilizing the water by employing a sterilizing treatment using ozone at a temperature in the range of about 20° to about 50° C.;
    (c) sealing the plastic container with a cap having an interior surface comprising a polymeric blend of one or more polymers; an organic additive selected from the group consisting of erucamide, behenamide, stearamide, oleamide, ethylene bis-stearamide, and ethylene bis-oleamide; and an odor-scalping zeolite, wherein the zeolite pore size ranges from about 1 to about 50 angstroms such that any unwanted odors or tastes produced by the sterilization using ozone in the presence of said organic additive are absorbed by the odor-scalping zeolite.

2. The method of claim 1 wherein step (b) is further accomplished by a method selected from the group consisting of: treating with UV light or treating with an electron beam.

3. The method of claim 1 wherein the plastic container comprises polyester.

4. The method of claim 1 wherein the cap additionally comprises a cap liner affixed to the interior surface, and wherein such cap liner additionally comprises a polymeric blend of one or more polymers; an organic additive selected from the group consisting of erucamide, behenamide, stearamide, oleamide, ethylene bis-stearamide, and ethylene bis-oleamide; and zeolite, wherein the zeolite pore size ranges from about 1 to about 50 angstroms.

5. The method of claim 4 wherein the cap liner comprises a material selected from the group consisting of: PP, LDPE, HDPE, mPE, EVA, ethylene acid copolymers and ionomers thereof.

6. The method of claim 5 wherein the zeolite comprises about 0.05% to about 10% by weight of the cap liner.

7. The method of claim 1 wherein step (c) occurs within about 0.001 to 5 minutes of the completion of step (b).

8. The method of claim 7 wherein step (c) occurs within about 0.01 to 1 minutes of the completion of step (b).

* * * * *

UNITED STATES PATENT AND TRADEMARK OFFICE
CERTIFICATE OF CORRECTION

PATENT NO.   : 6,761,825 B2
DATED        : July 13, 2004
INVENTOR(S)  : Kirk Allen G.

It is certified that error appears in the above-identified patent and that said Letters Patent is hereby corrected as shown below:

<u>Title page,</u>
Item [73], Assignee, delete "I. du Pont de Nemours and Company",
 add -- E.I. du Pont de Nemours and Company --

Signed and Sealed this

Twenty-third Day of November, 2004

JON W. DUDAS
*Director of the United States Patent and Trademark Office*